United States Patent
Sumi

(10) Patent No.: US 11,652,944 B2
(45) Date of Patent: May 16, 2023

(54) INFORMATION PROCESSING APPARATUS, SYSTEM, METHOD FOR INFORMATION PROCESSING APPARATUS, AND STORAGE MEDIUM FOR DISPLAYING A SCREEN THAT CORRESPONDS TO A SCREEN OF AN IMAGE PROCESSING APPARATUS

(71) Applicant: CANON KABUSHIKI KAISHA, Tokyo (JP)

(72) Inventor: Taiki Sumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/511,007

(22) Filed: Oct. 26, 2021

(65) Prior Publication Data
US 2022/0141347 A1    May 5, 2022

(30) Foreign Application Priority Data
Oct. 30, 2020   (JP) .............................. JP2020-183170

(51) Int. Cl.
*H04N 1/00* (2006.01)

(52) U.S. Cl.
CPC ..... *H04N 1/00973* (2013.01); *H04N 1/00214* (2013.01); *H04N 1/00424* (2013.01); *H04N 1/00427* (2013.01); *H04N 1/00474* (2013.01); *H04N 2201/0075* (2013.01); *H04N 2201/0094* (2013.01)

(58) Field of Classification Search
CPC ........... H04N 1/00973; H04N 1/00214; H04N 1/00424; H04N 1/0042; H04N 1/00474; H04N 2201/0075; H04N 2201/0094; H04N 2201/0072; H04N 1/00307
USPC ......................................................... 358/1.15
See application file for complete search history.

(56) References Cited

U.S. PATENT DOCUMENTS

2018/0191917 A1 *   7/2018   Kawamura ........ H04N 1/00129

FOREIGN PATENT DOCUMENTS

| JP | 2007159057 A | | 6/2007 |
|---|---|---|---|
| JP | 2016129299 A | * | 7/2016 |
| JP | 2016129299 A | | 7/2016 |
| JP | 6451194 B2 | * | 1/2019 |
| JP | 6451194 B2 | | 1/2019 |

* cited by examiner

*Primary Examiner* — Kent Yip
(74) *Attorney, Agent, or Firm* — Canon U.S.A., Inc. IP Division

(57) ABSTRACT

There is provided a method for an information processing apparatus configured to communicate with an image processing apparatus. The method includes displaying a screen of an application, wherein the screen corresponds to a screen displayed on a display unit of the image processing apparatus and is subjected to display control by the image processing apparatus, and transmitting an instruction to stop the display control to the image processing apparatus if a predetermined condition is satisfied in a state where the application is no longer operating as a user's operation target on the information processing apparatus.

18 Claims, 11 Drawing Sheets

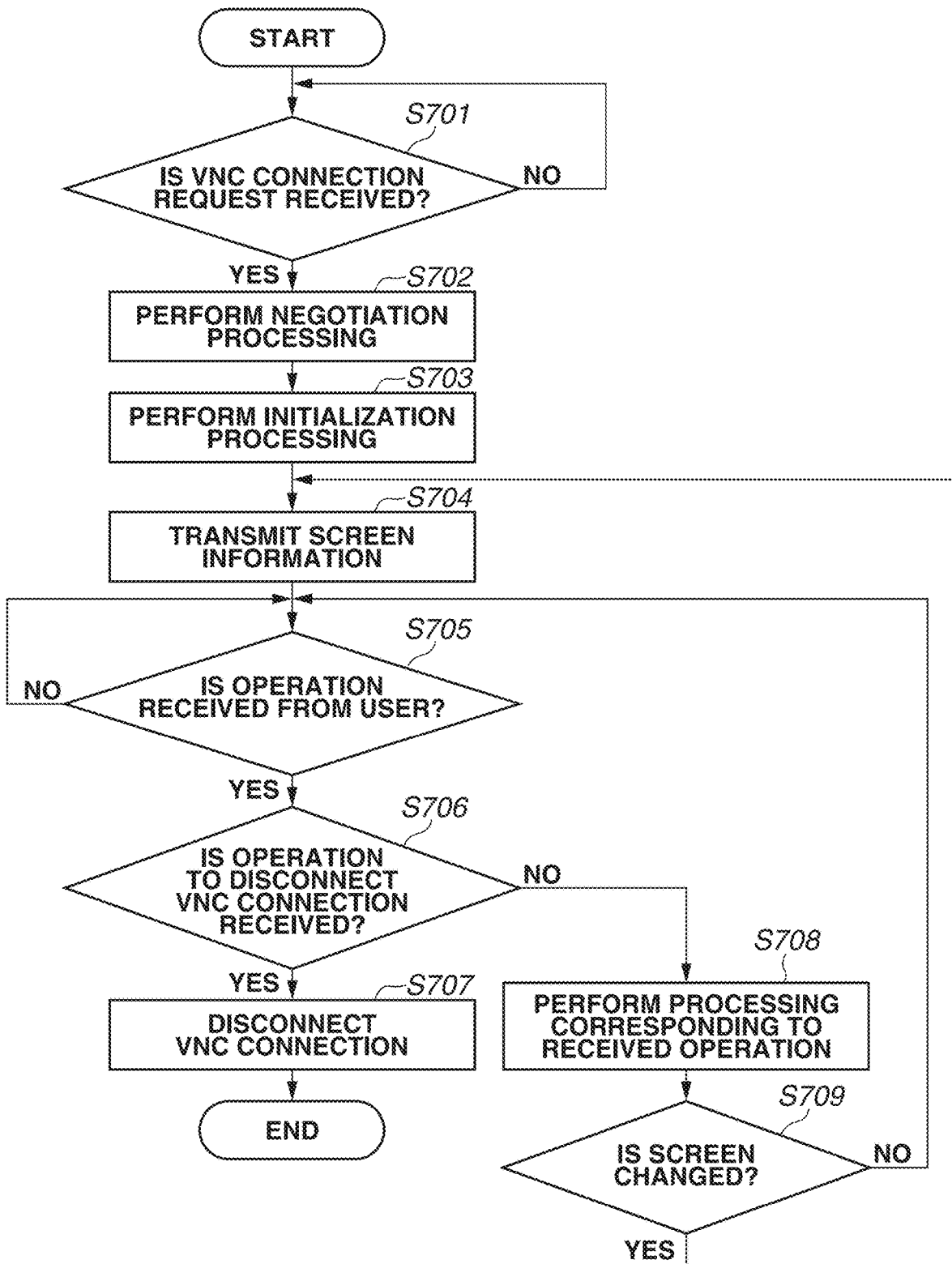

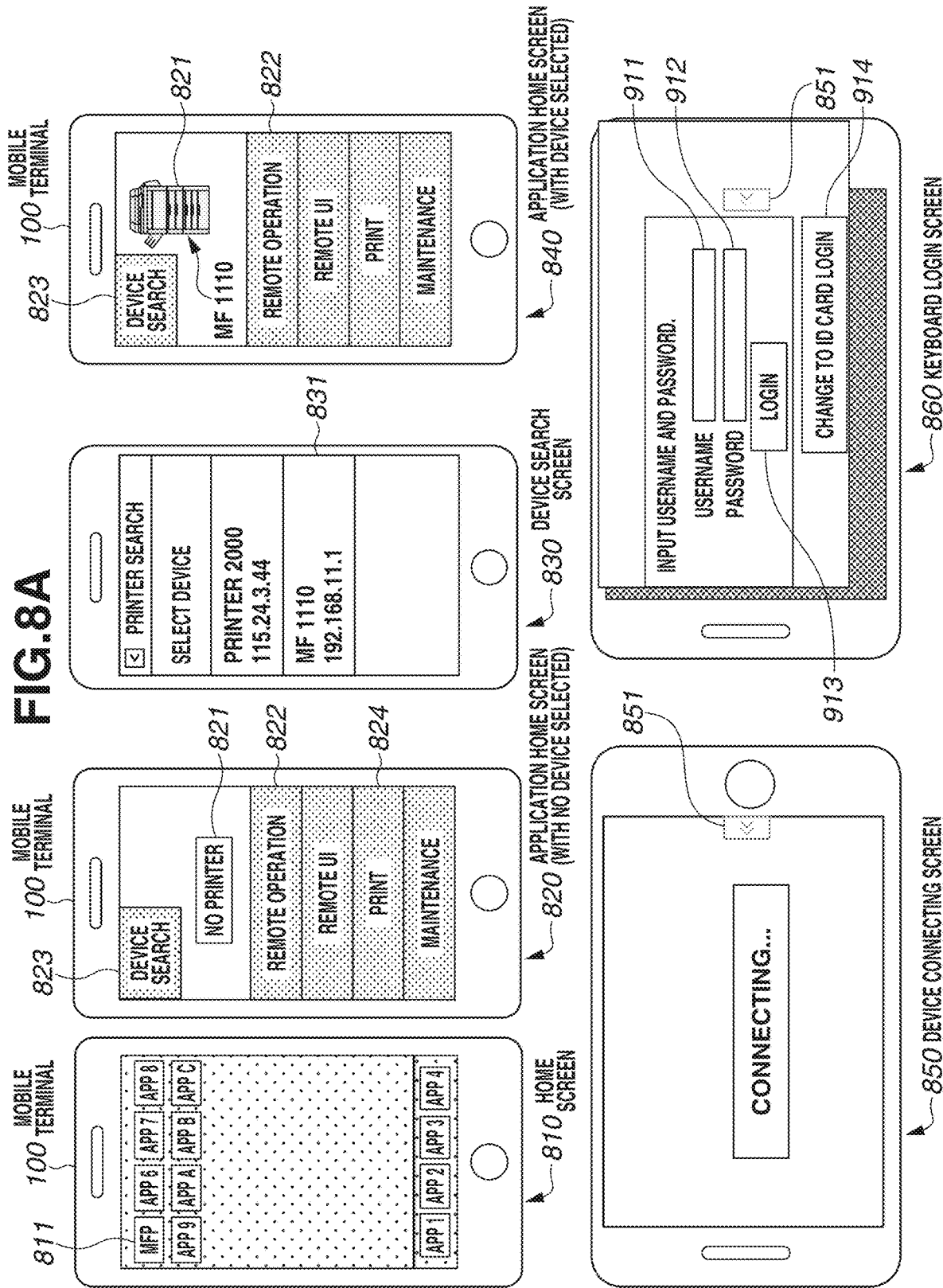

INFORMATION PROCESSING APPARATUS, SYSTEM, METHOD FOR INFORMATION PROCESSING APPARATUS, AND STORAGE MEDIUM FOR DISPLAYING A SCREEN THAT CORRESPONDS TO A SCREEN OF AN IMAGE PROCESSING APPARATUS

BACKGROUND

Field of the Disclosure

The present disclosure relates to a remote operation of an operation panel.

Description of the Related Art

As a method for remotely operating an operation screen of an image processing apparatus, a method using Virtual Network Computing (VNC) with the Remote Framebuffer (RFB) protocol has been discussed. This method enables an operation screen of an image processing apparatus to be remotely operated from a personal computer (PC) or a mobile terminal. More specifically, an image processing apparatus having a VNC server function transmits screen information about an operation screen to a terminal having a VNC client function. The terminal displays the same screen as the operation screen displayed on an operation panel of the image processing apparatus, based on the received screen information. By performing operations on the screen displayed on the terminal, the user can log in to the image processing apparatus on the operation screen provided by the image processing apparatus and instruct the image processing apparatus to perform processing without operating the operation panel of the image processing apparatus.

Japanese Patent Application Laid-Open No. 2007-159057 discusses a method for remotely operating an image processing apparatus using VNC, where the image processing apparatus enters a power saving mode if a main body operation unit of the image processing apparatus has not received an operation for a certain period of time.

An apparatus that provides a remote operation function often limits the number of apparatuses that can remotely operate the apparatus to one in order to limit the number of operators to one. In the case of remotely operating an image processing apparatus from a terminal using VNC, if a user has established a VNC connection with the image processing apparatus, the other users are unable to establish a VNC connection with the image processing apparatus. For example, suppose that a user establishes a VNC connection with the information processing apparatus on the terminal, and operates the terminal to log in to the image processing apparatus and instruct the image processing apparatus to perform print processing. In this case, if the user forgets to disconnect the VNC connection and switches an application operating as the VNC client on the terminal to a background state after the end of the processing, the other users are unable to establish a VNC connection with the image processing apparatus since the VNC connection is still established.

SUMMARY

Embodiments of the present disclosure are directed to providing a method where even if a user has finished using a remote operation function of an apparatus but has not stopped the remote operation function, another user can remotely operate the apparatus.

According to embodiments of the present disclosure, a method for an information processing apparatus configured to communicate with an image processing apparatus includes displaying a screen of an application, wherein the screen corresponds to a screen displayed on a display unit of the image processing apparatus and is subjected to display control by the image processing apparatus, and transmitting an instruction to stop the display control to the image processing apparatus if a predetermined condition is satisfied in a state where the application is no longer operating as a user's operation target on the information processing apparatus.

Further features of the present disclosure will become apparent from the following description of exemplary embodiments with reference to the attached drawings.

BRIEF DESCRIPTION OF THE DRAWINGS

FIG. 7 is a flowchart illustrating remote operation processing performed by the MFP according to the exemplary embodiment.

FIGS. 8A and 8B are diagrams illustrating a user interface (UI) displayed on an operation panel of the mobile terminal according to the exemplary embodiment.

DESCRIPTION OF THE EMBODIMENTS

Exemplary embodiments of the present disclosure will be described below with reference to the accompanying drawings. The exemplary embodiments described below are not intended to limit the disclosure, and all combinations of features described in the exemplary embodiments are not necessarily indispensable to solving means of the present disclosure.

<System Configuration>

Figure 1:
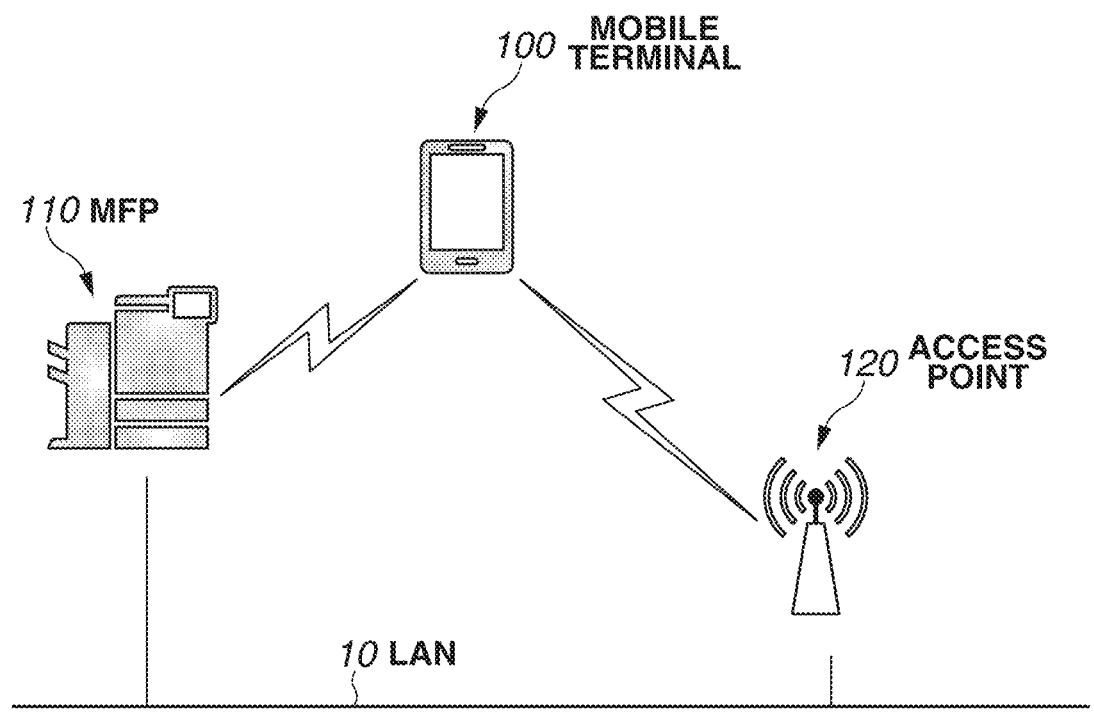
FIG. 1 is a diagram illustrating a system configuration according to an exemplary embodiment.

First, a system configuration according to an exemplary embodiment of the present disclosure will be described with reference to FIG. 1. In the present exemplary embodiment, a mobile terminal 100 and a multifunction peripheral (MFP) 110 will be described as examples of information processing apparatuses. However, apparatuses included in an information processing system are not limited thereto. The mobile terminal 100 and the MFP 110 are connected to a local area network (LAN) 10 and can exchange information with each other. The mobile terminal 100 is connected to the LAN 10 via an access point 120.

The mobile terminal 100 has a Virtual Network Computing (VNC) client function for remotely operating the MFP 110. More specifically, the mobile terminal 100 includes VNC client software that supports the Remote Framebuffer (RFB) protocol. The mobile terminal 100 can establish a VNC connection with the MFP 110 and display, on an operation panel 206 (see FIG. 2), the same screen as that displayed on an operation panel (DISPLAY) 3090 (see FIG. 4) of the MFP 110. The MFP 110 has a VNC server function. When the mobile terminal 100 has established a VNC connection with the MFP 110, the MFP 110 transmits screen information to the mobile terminal 100 serving as the VNC client. The mobile terminal 100 draws a screen based on the screen information transmitted from the MFP 110. The screens displayed on the operation panels (display units) 206 and 3090 of the mobile terminal 100 and the MFP 110 are liked to each other so that the screens are changed based on an operation received on the drawn screen or an operation received on the MFP 110.

Figure 2:
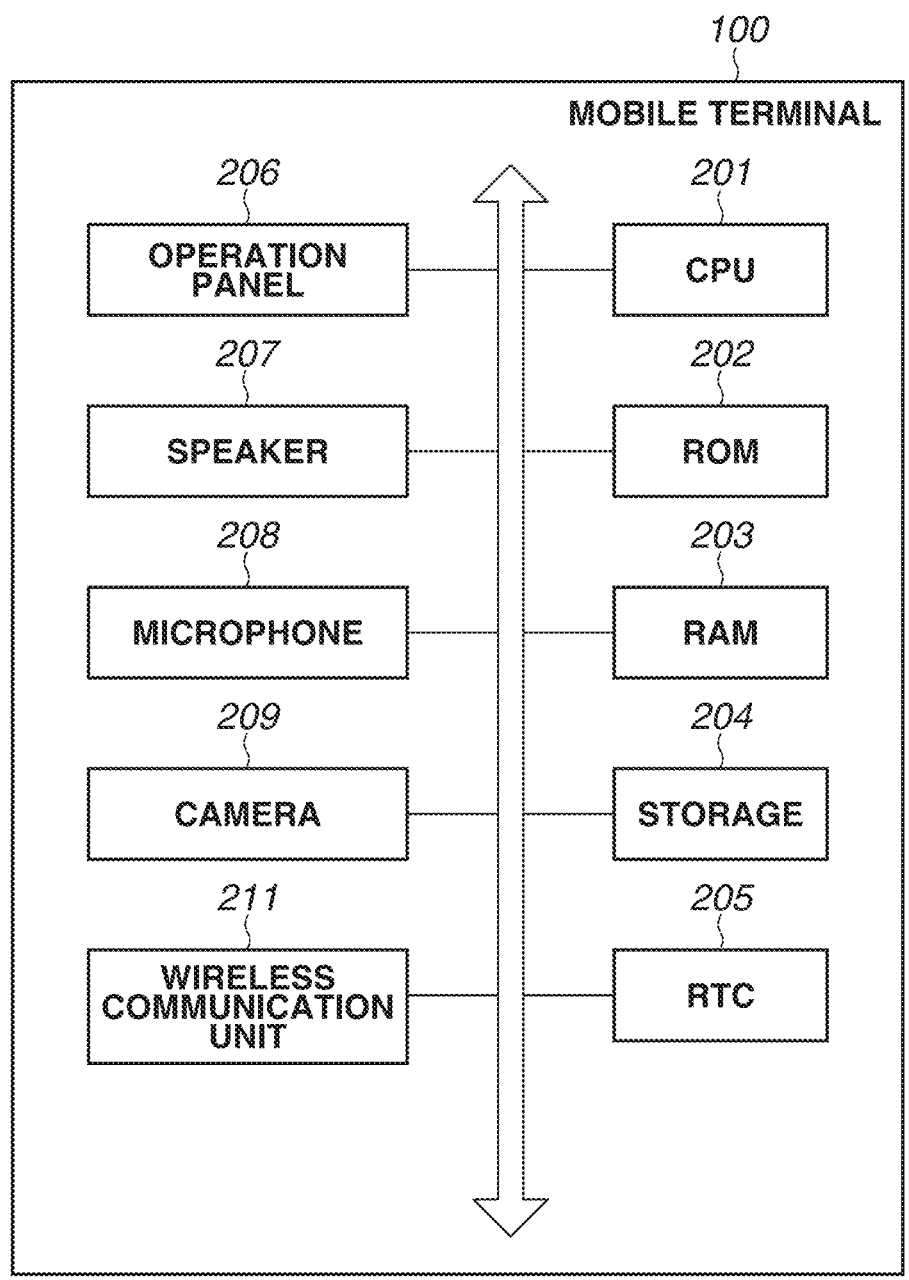
FIG. 2 is a block diagram illustrating a hardware configuration of a mobile terminal according to the exemplary embodiment.

Next, a hardware configuration of the mobile terminal 100 will be described with reference to FIG. 2. The mobile terminal 100 according to the present exemplary embodiment is assumed to be an apparatus such as a smartphone or a tablet personal computer (PC). Alternatively, the mobile terminal 100 may be another apparatus as long as the apparatus is an information processing apparatus communicable with the MFP 110.

A central processing unit (CPU) 201 reads control programs stored in a read-only memory (ROM) 202, and performs various types of processing for controlling an operation of the mobile terminal 100. The ROM 202 stores the control programs. A random access memory (RAM) 203 is used as a temporary storage area such as a main memory or a work area of the CPU 201. A storage 204 is an embedded MultiMediaCard (eMMC), a solid-state drive (SSD), or a hard disk drive (HDD), for example. The storage 204 stores various types of data such as pictures and electronic documents. An operating system (OS) 350 (see FIG. 3) and an MFP application 300 (see FIG. 3), which will be described below, are also stored in the storage 204. A real time clock (RTC) 205 clocks time.

While the mobile terminal 100 is configured so that the single CPU 201 performs each processing illustrated in a flowchart to be described below, any other configuration may be employed. For example, a plurality of the CPUs 201 can perform each processing illustrated in the flowchart in a cooperative manner.

The operation panel 206 includes a touch panel function capable of detecting a user's touch operation, and displays various screens provided by the OS 350 and the MFP application 300. The user can input a desired operation instruction to the mobile terminal 100 by inputting a touch operation to the operation panel 206.

A speaker 207 and a microphone 208 are used when the user calls another mobile terminal or a subscriber phone, for example. A camera 209 captures an image based on user's image capturing instructions. Pictures captured by the camera 209 are stored in a predetermined area of the storage 204. A wireless communication unit 211 performs wireless communication such as wireless LAN communication.

Figure 3:
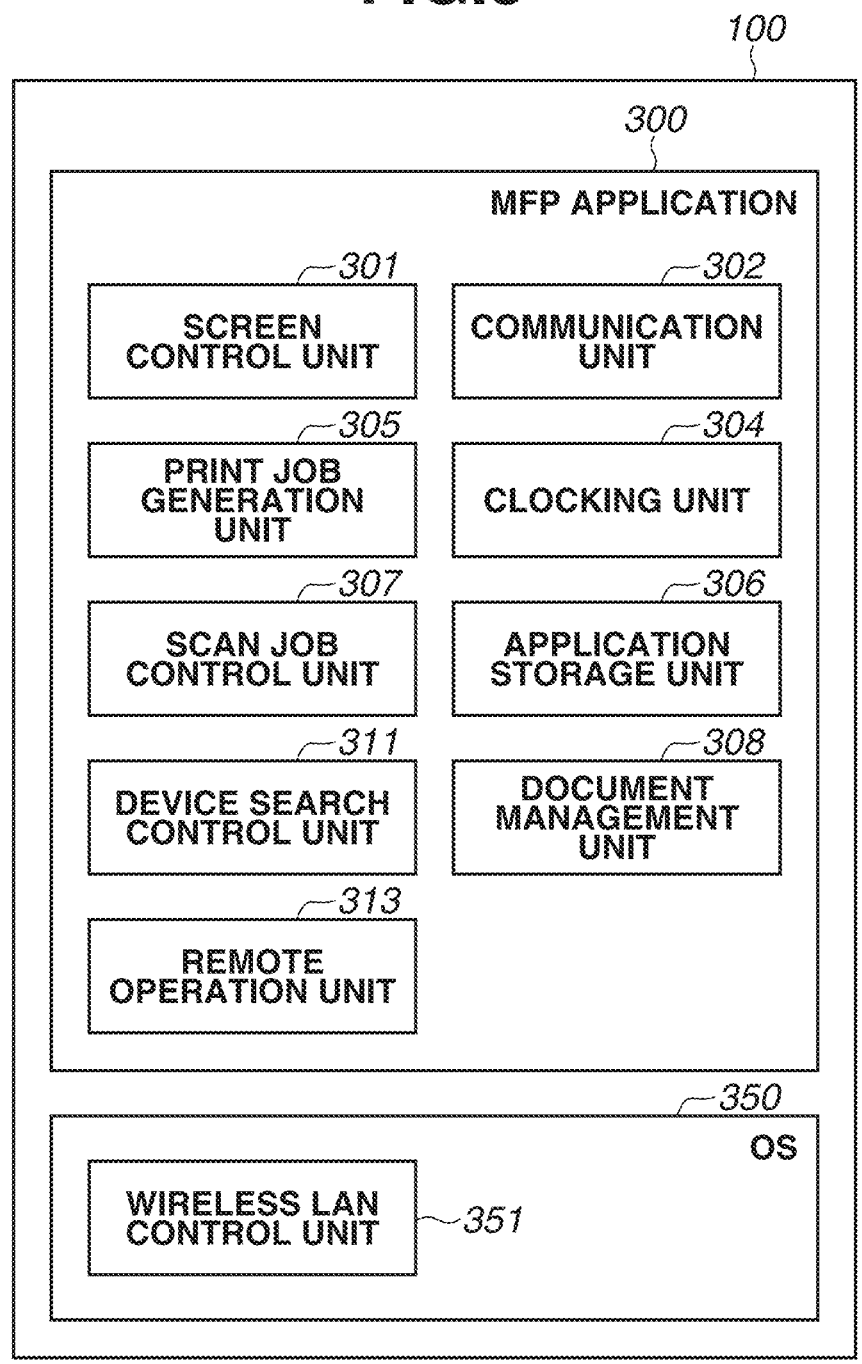
FIG. 3 is a block diagram illustrating a software configuration of the mobile terminal according to the exemplary embodiment.

Next, a software configuration of the mobile terminal 100 will be described with reference to FIG. 3. FIG. 3 is a functional block diagram of software that is implemented by the CPU 201 reading the control programs stored in the ROM 202 or the storage 204.

The OS 350 is software for controlling an entire operation of the mobile terminal 100. Various applications, including the MFP application 300 (described below), can be installed on the mobile terminal 100. The OS 350 exchanges information with the applications, and changes the screen displayed on the operation panel 206 based on instructions received from the applications. The OS 350 also includes a group of device drivers for controlling various pieces of hardware, and provides the applications operating on the OS 350 with application programming interfaces (APIs) for using the pieces of hardware. In the present exemplary embodiment, for example, a wireless LAN control unit 351 corresponds to the group of device drivers. The wireless LAN control unit 351 is a device driver for controlling the wireless communication unit 211.

The MFP application 300 is an application installed on the mobile terminal 100. The MFP application 300 can issue a print instruction and a scan instruction to the MFP 110. As described above, the MFP application 300 also has the function of operating as a VNC client to display an operation screen of the MFP 110 and remotely operate the MFP 110. While various applications other than the MFP application 300 can be installed on the mobile terminal 100, a description thereof will be omitted here.

A configuration of the MFP application 300 will be described in more detail. A screen control unit 301 controls the screen displayed on the operation panel 206 via the OS 350. The screen of the MFP application 300 is displayed on the operation panel 206 by the screen control unit 301. The screen control unit 301 also receives the operation instruction input by the user via the operation panel 206. A communication unit 302 controls wireless communication of the wireless communication unit 211 via the OS 350, and transmits and receives information to and from an external apparatus such as the MFP 110.

A device search control unit 311 generates search data for searching for an external apparatus to be connected to the mobile terminal 100, and transmits the search data to external apparatuses on the LAN 10 via the wireless communication unit 211. The device search control unit 311 receives a response from an external apparatus responding to the search. The search data may be broadcast to all the external apparatuses on the LAN 10 or may be transmitted to one external apparatus by specifying an address.

A print job generation unit 305 generates a print job. The print job generated by the print job generation unit 305 is transmitted to the MFP 110 by the wireless communication unit 211. The MFP 110 performs printing based on the received print job.

A scan job control unit 307 transmits a scan instruction to the MFP 110 via the wireless communication unit 211. The MFP 110 performs a scan based on the scan instruction, and transmits data (scan data) generated by the scan to the mobile terminal 100. The mobile terminal 100 displays the received scan data. When the scan data is to be saved, the scan data is stored into an application storage unit 306. The stored scan data is managed by a document management unit 308.

A remote operation unit 313 displays a screen based on the screen information obtained from the MFP 110 that connects to the mobile terminal 100 using VNC, and receives an operation on the displayed screen. In other words, the remote operation unit 313 operates as the VNC client. More specifically, the remote operation unit 313 displays the screen based on the screen information received from the VNC server, and transmits, to the MFP 110, operation information including the position and type of the operation received on the displayed screen. The MFP 110 changes the screen displayed on the MFP 110 and the screen displayed on the mobile terminal 100, based on the received operation information. The application storage unit 306 temporarily stores various types of information generated by the MFP application 300. A clocking unit 304 clocks time.

Figure 4:
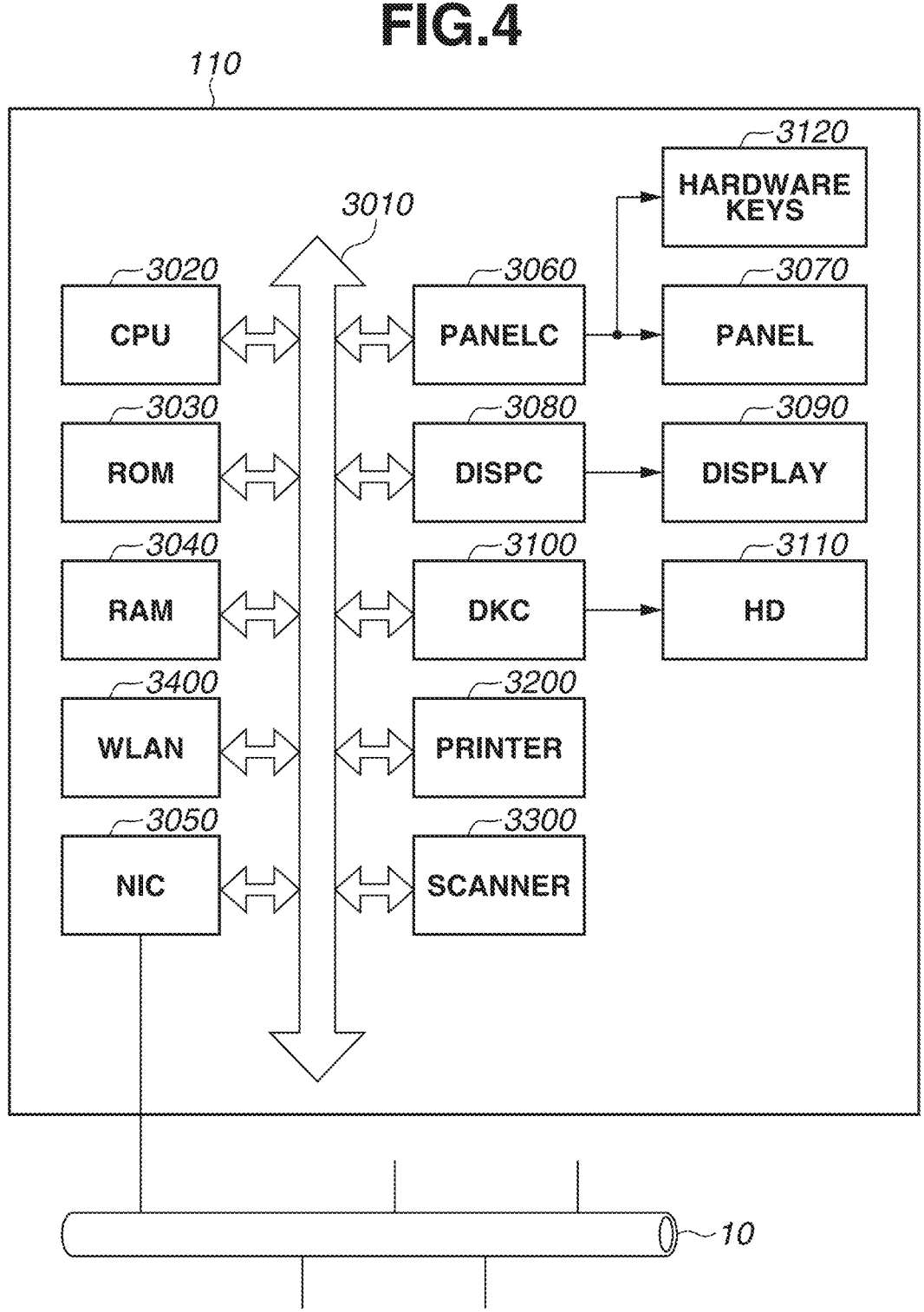
FIG. 4 is a block diagram illustrating a hardware configuration of a multifunction peripheral (MFP) according to the exemplary embodiment.

FIG. 4 illustrates an example of a hardware configuration of the MFP 110. The MFP 110 includes a CPU 3020 that executes programs stored in a ROM 3030 or a mass storage device (HD) 3110 such as a hard disk. The CPU 3020 controls the devices connected to a system bus 3010 in a centralized manner.

A RAM 3040 functions as a main memory or a work area of the CPU 3020. An external input controller (PANELC) 3060 controls instructions input via various hardware keys 3120 or a touch panel (PANEL) 3070 provided on the MFP 110. A display controller (DISPC) 3080 controls display on the display module (DISPLAY) 3090 such as a liquid crystal display. A disk controller (DKC) 3100 controls the mass storage device (HD) 3110.

An operation unit 900 of the MFP 110 will be described now with reference to FIG. 9. A screen is displayed on the DISPLAY 3090. The hardware keys 3120 are arranged next to the DISPLAY 3090. Both the touch panel 3070 on the DISPLAY 3090 and the hardware keys 3120 can receive user's operations. A logout key 901, one of the hardware keys 3120, is a button that is pressed by the user who logs in to the MFP 110 in order to instruct the MFP 110 to perform logout processing.

Returning to FIG. 4, a network interface card (NIC) 3050 bidirectionally exchanges data with an external apparatus (such as the mobile terminal 100) or a file server via the LAN 10. A wireless communication module (WLAN) 3400 connects to the access point 120 or operates in an access point mode, thereby enabling the MFP 110 to operate as an access point and establish a direct wireless communication connection with the mobile terminal 100. A printer 3200 is a paper printing unit using an electrophotographic method. The printing method is not limited to the electrophotographic method. A scanner 3300 is an image reading unit for reading an image printed on paper. The scanner 3300 is often equipped with an automatic document feeder (ADS) (not illustrated) as an option, and can automatically read a plurality of document sheets. In some cases, the mass storage device (HD) 3110 is used as a temporary storage location for images.

Figure 5:
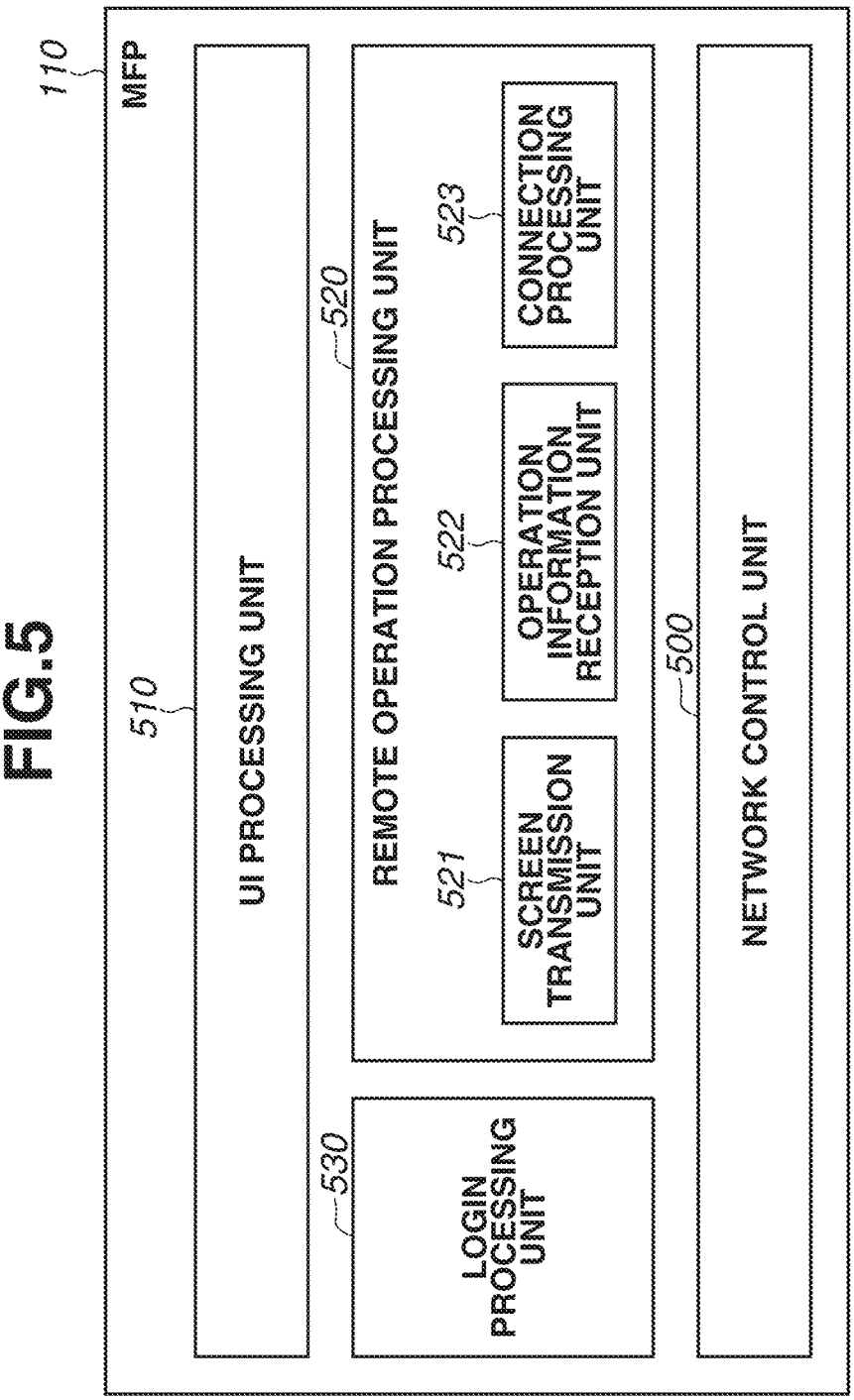
FIG. 5 is a block diagram illustrating a software configuration of the MFP according to the exemplary embodiment.

FIG. 5 is a block diagram illustrating a software configuration of the MFP 110. The software is stored in the ROM 3030, for example, and executed by the CPU 3020.

A user interface (UI) processing unit 510 analyzes an input from the external input controller 3060 or operation information received from an operation information reception unit 522 (described below). In a case where the screen is to be changed, the UI processing unit 510 generates image data and displays the image data on the DISPLAY 3090.

Figure 9:
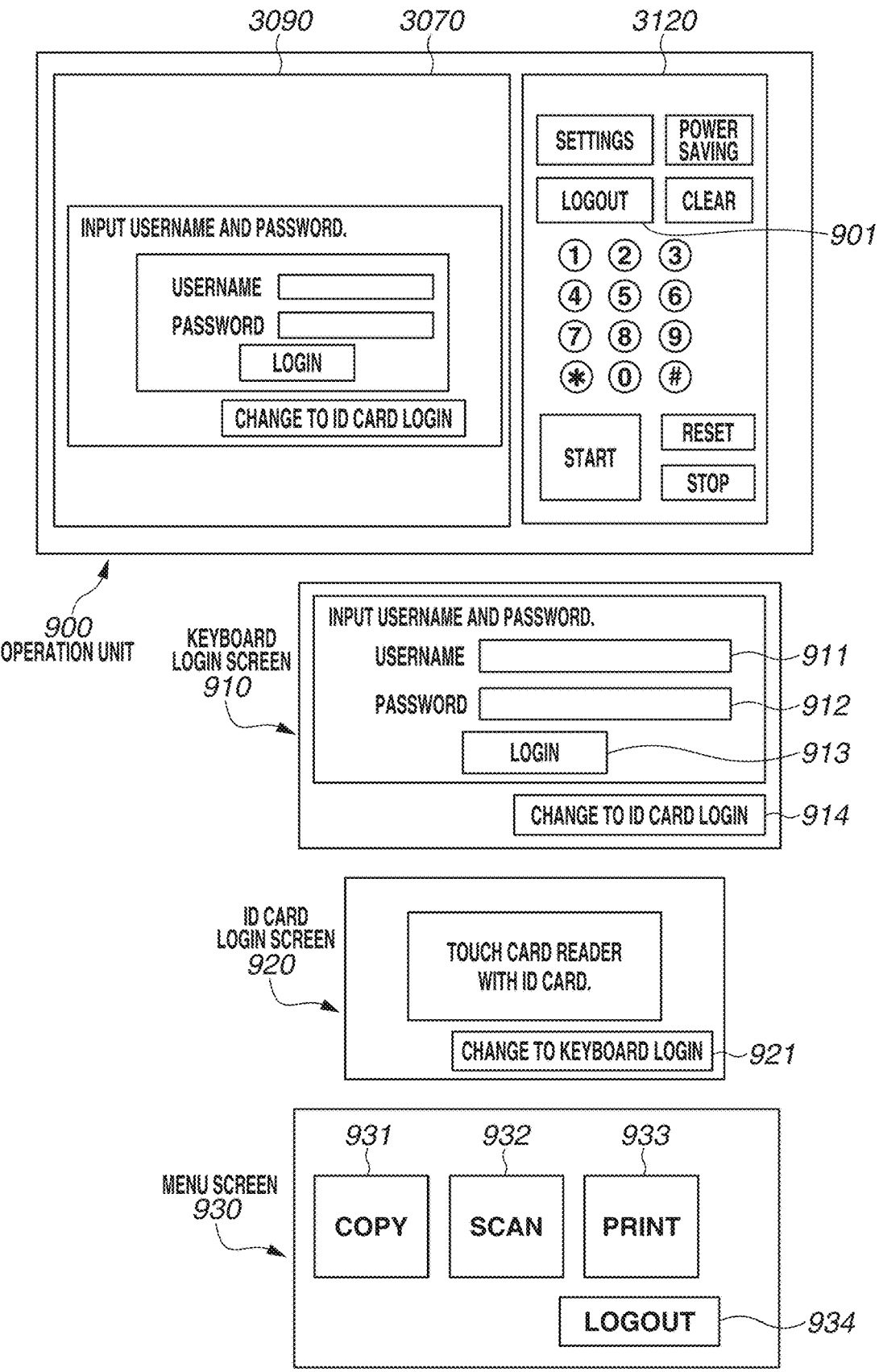
FIG. 9 is a diagram illustrating a UI displayed on an operation panel of the MFP according to the exemplary embodiment.

The DISPLAY 3090 displays various screens as illustrated in FIG. 9. Examples of the screens include an identification (ID) card login screen 920, a keyboard login screen 910, a menu screen 930 to be displayed during login, an error screen (not illustrated) to be displayed when an error occurs, and a counter screen (not illustrated) for displaying counter information. The DISPLAY 3090 is hidden while the MFP 110 is in a sleep state.

The ID card login screen 920 is a screen for logging in to the MFP 110 using an ID card associated with user information. When the ID card is held over an ID card reader of the MFP 110 while the ID card login screen 920 is displayed, the user information is read and login processing is performed. When a change to keyboard login button 921 is pressed, the ID card login screen 920 is switched to the keyboard login screen 910.

The keyboard login screen 910 is a screen for logging in to the MFP 110 by inputting the user information using a keyboard. The login processing is performed by inputting the user information into a username input field 911 and a password input field 912 using the hardware keys 3120 or a software keyboard (not illustrated) and then pressing a login button 913. When a change to ID card login button 914 is pressed, the keyboard login screen 910 is switched to the ID card login screen 920.

The menu screen 930 is displayed after the user logs in to the MFP 110 via the keyboard login screen 910 or the ID card login screen 920. The user can use various functions of the MFP 110 by pressing a copy button 931, a scan button 932, or a print button 933 depending on the intended use. When the user presses a logout button 934, the logout processing is performed.

Returning to FIG. 5, a remote operation processing unit 520 includes modules such as a connection processing unit 523, an operation information reception unit 522, and a screen transmission unit 521. The remote operation processing unit 520 is a VNC server module that performs communication using the RFB protocol, i.e., a software module that communicates with the mobile terminal 100 operating as the VNC client via the LAN 10. The connection processing unit 523 performs connection processing in a case where a connection request is received from the MFP 110 or the mobile terminal 100 serving as the VNC client. The connection processing unit 523 performs disconnection processing in a case where a connection disconnection request is received from the MFP 110 or the mobile terminal 100.

The operation information reception unit 522 receives screen operation information from the mobile terminal 100 or the MFP 110, and notifies the UI processing unit 510 of the screen operation information. The screen transmission unit 521 is a display control unit that performs screen display control by reading, from the RAM 3040, the image data generated by the UI processing unit 510 and transmitting the image data to the mobile terminal 100 serving as the VNC client.

A login processing unit 530 is a module for performing the login processing of the MFP 110. The login processing unit 530 performs user authentication based on user information received from the UI processing unit 510, and performs a login if the user authentication is successful. If the login processing unit 530 receives a logout instruction from the UI processing unit 510, the login processing unit 530 performs the logout processing. A network control unit 500 is a module for controlling the NIC 3050. Although not illustrated in FIG. 5, the MFP 110 also includes a printer module for controlling the printer 3200 and a scanner module for controlling the scanner 3300.

Figure 8B:
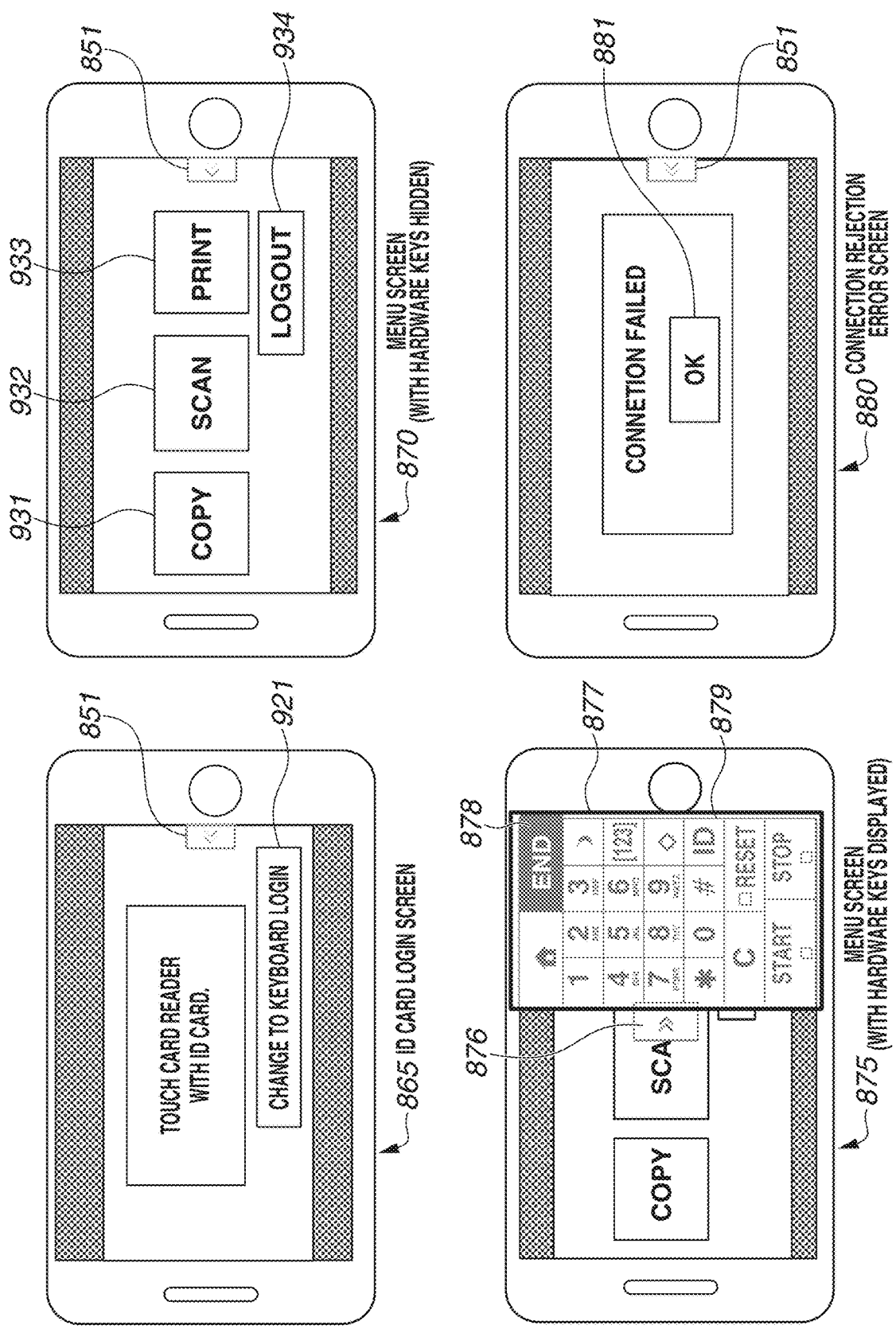

FIGS. 8A and 8B illustrate examples of screens displayed on the operation panel 206 of the mobile terminal 100. When the mobile terminal 100 is activated, a home screen 810 appears. An MFP application icon 811 is an icon for activating the MFP application 300. When the MFP application icon 811 is operated, the MFP application 300 is activated.

When the MFP application 300 is activated, an application home screen (with no device selected) 820 appears. A selected device icon 821 displays information about a target MFP with which the MFP application 300 is currently communicating and to which a print job is to be transmitted. With no target MFP selected, the selected device icon 821 displays "No Printer". A device search button 823 is used to search for the target MFP. A remote operation button 822 is used to establish a VNC connection with the target MFP and remotely operate the target MFP. The application home screen (with no device selected) 820 may also display other buttons such as a print button 824 for transmitting a print job to the target MFP and a button for issuing a scan instruction.

When the device search button 823 is pressed, a search is performed for MFPs on the LAN 10, and a device search screen 830 appears to display results of the search. More specifically, the device search screen 830 displays a list of MFPs that have responded to the search. For example, selecting a search result 831 from the displayed list enables selection of the target MFP.

When the target MFP is selected, an application home screen (with device selected) 840 appears. The selected device icon 821 displays information about the MFP selected on the device search screen 830. If the user taps on the remote operation button 822 with the target MFP selected, the remote operation function of the target MFP is started. The following description will be given on the assumption that the target MFP is the MFP 110.

When the remote operation function is started, a device connecting screen 850 appears. When a hardware key display button 851 is pressed, a UI for operating the hardware keys 3120 of the MFP 110 appears. Details thereof will be described below.

When the VNC connection is completed and the remote operation function is established, the screen displayed on the DISPLAY 3090 of the MFP 110 is displayed on the operation panel 206. Here, a keyboard login screen 860 similar to the keyboard login screen 910 is displayed on the operation panel 206. The screen contents are the same as those of the keyboard login screen 910 on the MFP 110 except that the hardware key display button 851 is displayed on the operation panel 206. A description thereof will thus be omitted. If the ID card login screen 920 is displayed on the MFP 110, an ID card login screen 865 is displayed on the operation panel 206.

When a login instruction is given on the keyboard login screen 860, a menu screen (with hardware keys hidden) 870 similar to the menu screen 930 is displayed on the operation panel 206. At this time, the menu screen 930 is also displayed on the DISPLAY 3090.

If the hardware key display button 851 is tapped, a menu screen (with hardware keys displayed) 875 is displayed. In other words, a software keyboard to which the functions of the respective hardware keys 3120 of the MFP 110 are assigned is displayed. A hardware key UI 877 is a UI for operating the hardware keys 3120 of the MFP 110. If a key displayed on the hardware key UI 877 is tapped, information about the tapped key is transmitted to the MFP 110, and the MFP 110 performs processing based on the tapped key. If a logout (ID) key 879 corresponding to the logout key 901 of the MFP 110 is tapped, the user logs out from the MFP 110. If an end button 878 on the hardware key UI 877 is tapped, the remote operation function is ended, i.e., the VNC connection is ended. After the VNC connection is ended, the application home screen (with device selected) 840 is displayed on the operation panel 206. After the VNC connection is ended, the DISPLAY 3090 continues displaying the screen displayed before the end of the VNC connection.

If the user who has finished using the remote operation function keeps the MFP application 300 operating as the VNC client in a non-foreground state (for example, in a background state) without performing the operation for ending the VNC connection, the following issue arises. An apparatus having a login configuration, like the MFP 110, often limits the number of external apparatuses that can establish a VNC connection with the apparatus to one in order to limit the number of operators to one. If the user forgets to perform the operation for disconnecting the VNC connection after the end of the remote operation function, the other users are unable to establish a VNC connection with the MFP 110. Suppose, for example, that the user starts the remote operation function, instructs the MFP 110 to perform print processing or scan processing from the mobile terminal 100, and then forgets to press the end button 878 and uses another application without pressing the end button 878 (which switches the MFP application 300 to the background state). In this case, the other users are unable to establish a VNC connection with the MFP 110 since the VNC connection between the mobile terminal 100 and the MFP 110 is continued. To solve this issue, the mobile terminal 100 performs control so that if the MFP application 300 serving as the VNC client is no longer in the foreground state on the mobile terminal 100, another apparatus is able to establish a VNC connection with the MFP 110. For example, if a predetermined time has elapsed since the transition of the MFP application 300 from the foreground state on the mobile terminal 100, the VNC connection is to be disconnected or a "priority state" (described in details below) of the VNC connection is to be canceled. In the present exemplary embodiment, the foreground state of the MFP application 300 refers a state where the MFP application 300 is active, such as a state where the MFP application 300 is a user's operation target on the information processing apparatus (the mobile terminal 100). In other words, the MFP application 300 is displayed on the information processing apparatus, and performs processing in response to receiving a user's operation, such as a tap. While the MFP application 300 is in the foreground state, the OS 350 of the information processing apparatus preferentially performs the processing of the MFP application 300. The background state of the MFP application 300 refers to a state where the MFP application 300 is operating but inactive and is not a user's operation target.

Figure 6A:
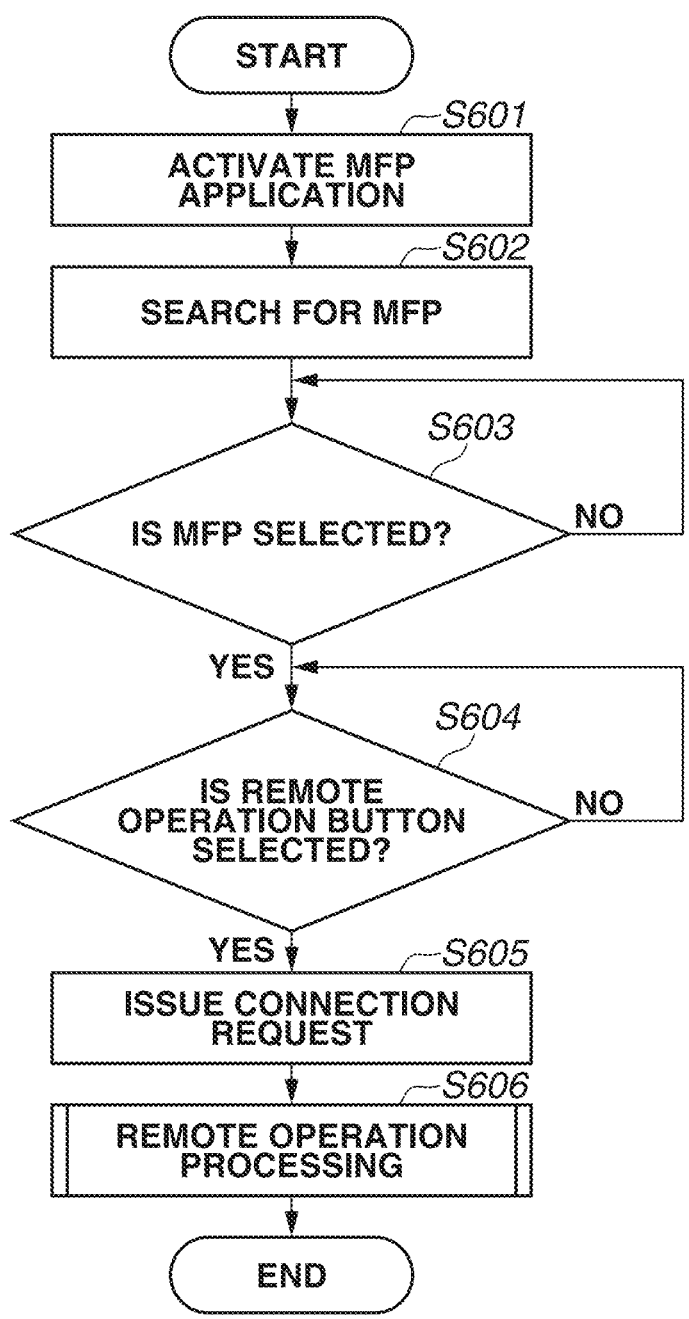
FIG. 6A is a flowchart illustrating processing performed by an application operating on the mobile terminal according to the exemplary embodiment.

FIG. 6A is a flowchart illustrating processing in which the mobile terminal 100 establishes a VNC connection with the MFP 110, performs a remote operation, and then disconnects the VNC connection. The steps illustrated in the flowchart of FIG. 6A are processed by the CPU 201 loading the control programs stored in a memory such as the ROM 202 into the RAM 203 and executing the control programs.

In step S601, the MFP application 300 is activated when the screen control unit 301 detects a tap on the MFP application icon 811 on the home screen 810. In step S602, the screen control unit 301 detects a tap on the device search button 823 on the application home screen (with no device selected) 820, and performs a search for MFPs. In step S603, the screen control unit 301 determines whether an MFP is selected on the device search screen 830. If the screen control unit 301 determines that an MFP is selected on the device search screen 830 (YES in step S603), the application home screen (with no device selected) 820 is switched to the application home screen (with device selected) 840 and the processing proceeds to step S604. If not (NO in step S603), the processing returns to step S603.

In step S604, the screen control unit 301 determines whether the remote operation button 822 is selected on the application home screen (with device selected) 840. If the screen control unit 301 determines that the remote operation button 822 is selected on the application home screen (with device selected) 840 (YES in step S604), the processing proceeds to step S605. If not (NO in step S604), the processing returns to step S604.

In step S605, the remote operation unit 313 issues a connection request using the RFB protocol to the MFP selected in step S603. In step S606, the remote operation unit 313 performs remote operation processing.

Figure 6B:
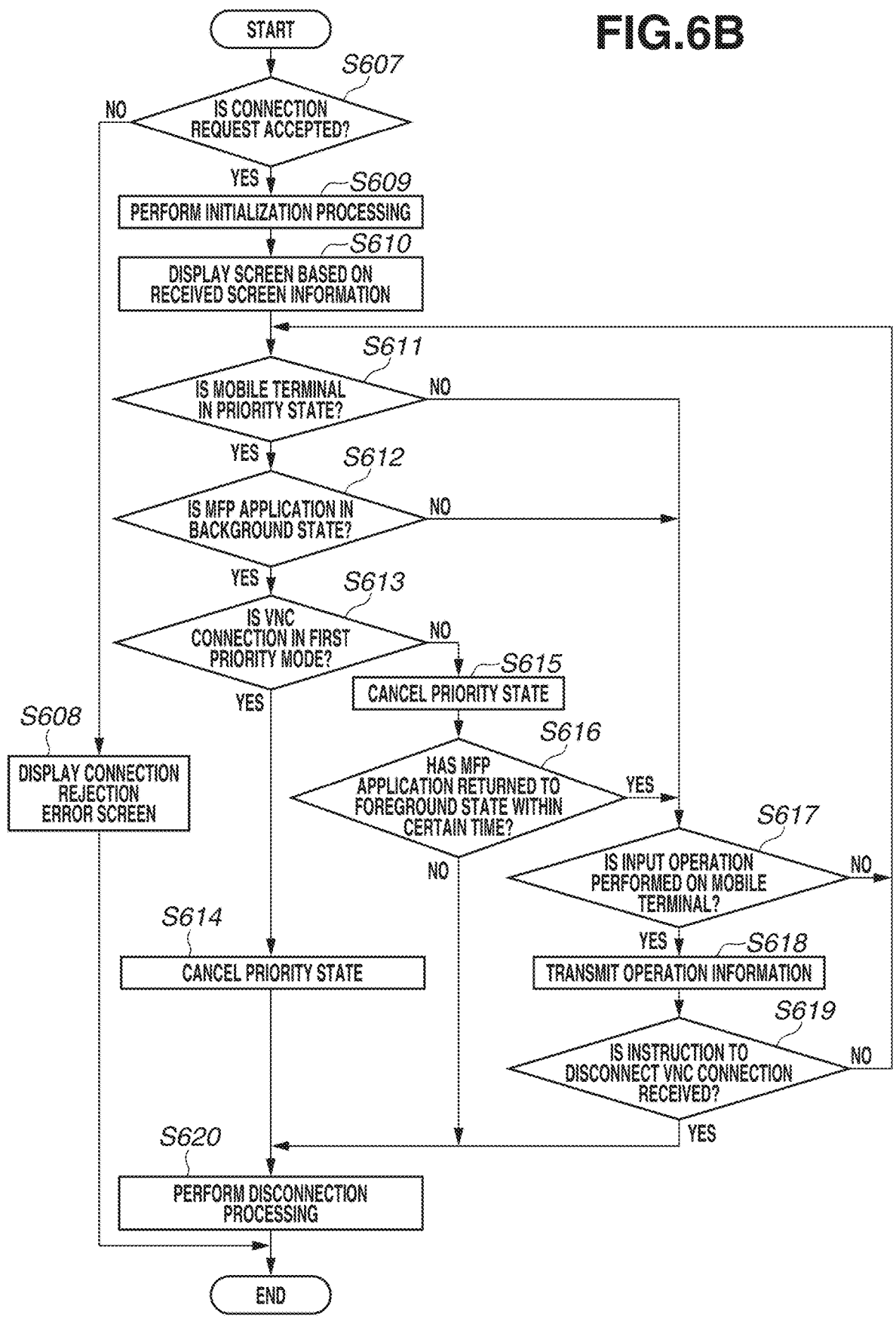
FIG. 6B is a flowchart illustrating remote operation processing performed by the mobile terminal according to the exemplary embodiment.

The remote operation processing in step S606 will be described in details with reference to FIG. 6B. First, in step S607, the remote operation unit 313 determines whether the connection request using the RFB protocol is accepted. If the connection request is accepted (YES in step S607), the processing proceeds to step S609. If the connection request is not accepted (NO in step S607), the processing proceeds to step S608. Whether the connection request is accepted is determined based on response data about the connection request. In step S608, the screen control unit 301 displays a connection rejection error screen 880 (see FIG. 8B), and the processing ends.

In step S609, the remote operation unit 313 performs initialization processing based on the RFB protocol. In the initialization processing, the remote operation unit 313 transmits VNC client information and receives VNC server information to and from the MFP 110.

In step S610, the remote operation unit 313 displays a screen on the operation panel 206 based on the screen information received from the MFP 110, i.e., the VNC server. For example, if the screen displayed on the DISPLAY 3090 is the keyboard login screen 910, the keyboard login screen 860 is displayed on the operation panel 206. The remote operation unit 313 displays a screen in step S610 each time screen information is transmitted from the MFP 110.

In step S611, the remote operation unit 313 determines whether the mobile terminal 100 is in the priority state. If the mobile terminal 100 is in the priority state (YES in step S611), the processing proceeds to step S612. If not (NO in step S611), the processing proceeds to step S617. The term "priority state" refers to a state where while the mobile terminal 100 establishes a VNC connection with the MFP 110, the other apparatuses are rejected so as not to establish a VNC connection with the MFP 110. For example, the VNC connection has two modes, a first priority mode and a last priority mode. In the first priority mode, a VNC connection with the apparatus connected earlier is given priority, and any other apparatus requesting a VNC connection later is controlled not to be connected. In the last priority mode, a VNC connection with the last apparatus requesting a VNC connection is given priority. In other words, a VNC connection with the apparatus connected earlier is disconnected if another apparatus requests a VNC connection later, and a VNC connection with the other apparatus requesting a VNC connection later is established. In the case of the first priority mode, since the subsequent connection requests can be rejected upon establishment of the VNC connection, the mobile terminal 100 enters the "priority state" once the VNC connection has successfully been established. By contrast, in the case of the last priority mode, even when a VNC connection has been successfully established, the VNC connection is to be disconnected if a VNC connection request is subsequently received from another apparatus. Thus, in the case of the last priority mode, the following control is performed for example. The mobile terminal 100 enters the "priority state" after a lapse of a predetermined time from the VNC connection. While the mobile terminal 100 is in the "priority state", if the VNC connection is disconnected due to a subsequent VNC connection request from another apparatus, the mobile terminal 100 automatically establishes a VNC connection again to restore the VNC connection. This control apparently disables the apparatus attempting a VNC connection later from establishing a VNC connection. In the last priority mode, this state will be referred to as the "priority state". While the example where the mobile terminal 100 enters the "priority state" after a lapse of a predetermined time from the VNC connection has been described above, this is not restrictive. The mobile terminal 100 may enter the "priority state" if the mobile terminal 100 establishes a VNC connection with the MFP 110 and the user logs in to the MFP 110.

In step S612, the remote operation unit 313 determines whether the MFP application 300 has transitioned to the background state on the mobile terminal 100. If the MFP application 300 is in the background state (YES in step S612), the processing proceeds to step S613. If not, i.e., the MFP application 300 is in the foreground state (NO in step S612), the processing proceeds to step S617. If the MFP application 300 has transitioned to the background state, the OS 350 notifies the MFP application 300 of the transition to the background state, and the MFP application 300 detects the transition of the MFP application 300 to the background state.

In step S613, the remote operation unit 313 determines whether the VNC connection is in the first priority mode or the last priority mode. The remote operation unit 313 may inquire of the MFP 110 which mode the VNC connection is in. If the VNC connection is in the first priority mode (YES in step S613), the processing proceeds to step S614. If the VNC connection is in the last priority mode (NO in step S613), the processing proceeds to step S615.

In step S614, the remote operation unit 313 cancels the priority state. In step S620, the remote operation unit 313 performs processing for disconnecting the VNC connection. In the first priority mode, the mobile terminal 100 enters the "priority state" once a VNC connection has successfully been established. Thus, canceling the "priority state" is synonymous with disconnecting the VNC connection. In this example, if the MFP application 300 has transitioned to the background state, the processing immediately proceeds to steps S614 and S620. Alternatively, the processing may proceed to steps S614 and S620 after a lapse of a predetermined time. In other words, the VNC connection may be disconnected immediately after the transition of the MFP application 300 to the background state, or may be disconnected after a lapse of a predetermined time from the transition to the background state.

In step S615, the remote operation unit 313 cancels the "priority state". Canceling the "priority state" here refers to entering a state where even if another apparatus establishes a VNC connection with the MFP 110 later, the mobile terminal 100 does not perform reconnection processing for restoring the VNC connection. In other words, the mobile terminal 100 transitions from the "priority state" where the mobile terminal 100 reconnects to restore the VNC connection if another apparatus establishes a VNC connection with the MFP 110 to the state where the mobile terminal 100 does not perform reconnection processing for restoring the VNC connection even if another apparatus establishes a VNC connection with the MFP 110. This enables another apparatus to establish a VNC connection with the MFP 110. The processing then proceeds to step S616.

In step S616, the remote operation unit 313 determines whether the MFP application 300 has returned to the foreground state within a certain period of time. If the MFP application 300 has returned to the foreground state within a certain period of time (YES in step S616), the processing proceeds to step S617. If not (NO in step S616), the processing proceeds to step S620. In step S620, the remote operation unit 313 performs the processing for disconnecting the VNC connection. The disconnection processing refers to, for example, transmitting operation information corresponding to the end button 878 to the MFP 110 and requesting the MFP 110 to disconnect the VNC connection.

In step S617, the remote operation unit 313 determines whether an input operation is performed on the mobile terminal 100. If an input operation is performed on the mobile terminal 100 (YES in step S617), the processing proceeds to step S618. If not (NO in step S617), the processing proceeds to step S611. In step S618, the remote operation unit 313 transmits operation information about the operation received on the mobile terminal 100 to the MFP 110.

In step S619, the remote operation unit 313 determines whether an instruction to disconnect the VNC connection is received. If the instruction to disconnect the VNC connection is received (YES in step S619), the processing proceeds to step S620. If not (NO in step S619), the processing proceeds to step S611. The instruction to disconnect the VNC connection is given for example by pressing the end button 878.

According to the above-described processing, in a case where the mobile terminal 100 establishes a VNC connection with the MFP 110, even if the MFP application 300 operating as the VNC client transitions to the background state on the mobile terminal 100 in response to the end of processing by the user, and the user forgets to give the instruction to disconnect the VNC connection, another apparatus can establish a VNC connection with the MFP 110. Furthermore, since the VNC connection between the mobile terminal 100 and the MFP 110 can be disconnected after satisfaction of a predetermined condition, i.e., a lapse of a predetermined time from the transition of the MFP application 300 to the background state, if another application such as a telephony application is used during the VNC connection, the mobile terminal 100 can maintain the VNC connection and continue operating the MFP 110 as long as the predetermined time has not elapsed.

The above-described processing has been described using the case where the VNC connection is disconnected if the MFP application 300 is switched to the background state, as an example. However, this is not restrictive, and the VNC connection may also be disconnected if the MFP application 300 is closed by the user. In this case, when the MFP application 300 is closed, the mobile terminal 100 transmits a VNC disconnection request to the MFP 110 to disconnect the VNC connection immediately, not after a lapse of a predetermined time.

Next, processing performed by the MFP 110 for screen linkage with the mobile terminal 100 using VNC will be described with reference to FIG. 7. The steps illustrated in the flowchart of FIG. 7 are processed by the CPU 3020 loading the control programs stored in a memory such as the ROM 3030 into the RAM 3040 and executing the control programs.

In step S701, the connection processing unit 523 determines whether a VNC connection request is received from the mobile terminal 100 serving as the VNC client. If a VNC connection request is received from the mobile terminal 100 (YES in step S701), the processing proceeds to step S702. If a VNC connection request is not received from the mobile terminal 100 (NO in step S701), the processing returns to step S701. In step S702, the connection processing unit 523 performs negotiation processing and connects to the VNC client. In step S703, the connection processing unit 523 performs initialization processing to receive client information and transmit server information from and to the mobile terminal 100.

In step S704, the screen transmission unit 521 transmits screen information about the screen displayed on the DISPLAY 3090 to the mobile terminal 100 serving as the VNC client.

In step S705, the operation information reception unit 522 determines whether an operation is received from the user. If an operation is received from the user (YES in step S705), the processing proceeds to step S706. If not (NO in step S705), the processing returns to step S705. For example, the operation information reception unit 522 determines that an operation is received from the user if operation information is received from the mobile terminal 100 or if a user's operation is detected by the PANEL 3070 or the hardware keys 3120 of the MFP 110.

In step S706, the operation information reception unit 522 determines whether the operation received in step S705 is an operation to disconnect the VNC connection. If the received operation is the operation to disconnect the VNC connection (YES in step S706), the processing proceeds to step S707. In step S707, the connection processing unit 523 disconnects the VNC connection. If not (NO in step S706), the processing proceeds to step S708.

In step S708, processing corresponding to the operation received in step S705 is performed. Examples of the processing include processing for causing the menu screen displayed on the DISPLAY 3090 to transition to the next page, processing for enabling the user to log in to the MFP 110, and processing for enabling the user to log out from the MFP 110. In step S709, the operation information reception unit 522 determines whether the screen displayed on the DISPLAY 3090 is changed by the processing performed in step S708. If the screen is changed (YES in step S709), the processing proceeds to step S704. If not (NO in step S709), the processing proceeds to step S705.

By using the above-described processing, the screen displayed on the MFP 110 can also be displayed on the mobile terminal 100. The screens displayed on the MFP 110 and the mobile terminal 100 can be changed based on an operation received by the MFP 110 or the mobile terminal 100. The above-described processing has been described using the case where the screen displayed on the mobile terminal 100 is changed based on an operation received by the MFP 110 or the mobile terminal 100. Also in a case where the screen displayed on the MFP 110 is changed without an operation received by the MFP 110 or the mobile terminal 100, the MFP 110 similarly transmits screen information after the change to the mobile terminal 100 and the mobile terminal 100 displays the screen after the change. The processing of the above-described flowchart enables disconnection of the VNC connection in response to a VNC disconnection request from the mobile terminal 100. If the user still logs in to the MFP 110 in disconnecting the VNC connection, the logout processing may be automatically performed. Moreover, in disconnecting the VNC connection, the MFP 110 may automatically perform auto-clear processing. The auto-clear processing refers to processing for restoring the displayed screen to a screen set as an initial screen.

According to the above-described exemplary embodiment, even if the user switches the MFP application 300 operating as the VNC client to the background state without performing the processing for disconnecting the VNC connection, another user can establish a VNC connection. In the above-described exemplary embodiment, the mobile terminal 100 determines whether to disconnect the VNC connection, considering the "priority state" of the mobile terminal 100, and transmits the request to disconnect the VNC connection. However, this is not restrictive. The MFP 110 may determine whether to disconnect the VNC connection, considering the "priority state" of the mobile terminal 100, and disconnect the VNC connection. In this case, the MFP 110 obtains, from the mobile terminal 100, information indicating the transition of the MFP application 300 to the background state, and determines whether to disconnect the VNC connection.

In the above-described exemplary embodiment, the example where the same screen as that displayed on the MFP 110 is displayed on the mobile terminal 100 by using a VNC connection has been described. However, this is not restrictive. For example, the above-described exemplary embodiment is also applicable to a case where a screen obtained by expanding the screen on the MFP 110 is displayed on the mobile terminal 100 instead of displaying the same screen as that on the MFP 110.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-183170, filed Oct. 30, 2020, which is hereby incorporated by reference herein in its entirety.

What is claimed is:

1. A method for an information processing apparatus configured to communicate with an image processing apparatus, the method comprising:

displaying a screen of an application, wherein the screen corresponds to a screen displayed on a display of the image processing apparatus and is subjected to display control by the image processing apparatus;

transmitting an instruction to stop the display control to the image processing apparatus if a first condition that the application is no longer operating as a user's operation target on the information processing apparatus, a status of a predetermined connection between the image processing apparatus for the display control and the information processing apparatus is in a first state, and a predetermined time has elapsed since stop of operation of the application as the user's operation target on the information processing apparatus is satisfied; and transmitting the instruction to stop the display control before elapse of the predetermined time since the stop of the operation of the application as the user's operation target on the information processing apparatus if a second condition that the application is no longer operating as the user's operation target on the information processing apparatus and the status of the predetermined connection is in a second state is satisfied.

2. The method according to claim 1, wherein a state where the application is no longer operating as the user's operation target on the information processing apparatus is a state where the application is no longer operating in a foreground state on the information processing apparatus.

3. The method according to claim 1, wherein a state where the application is no longer operating as the user's operation target on the information processing apparatus is a state where the application is operating in a background state on the information processing apparatus.

4. The method according to claim 1, wherein a state where the application is no longer operating as the user's operation target on the information processing apparatus is a state where the operation of the application is stopped.

5. The method according to claim 1, wherein the instruction to stop the display control is an instruction to disconnect communication for performing the display control.

6. The method according to claim 1, wherein the application is an application configured to issue a print instruction or a scan instruction to the image processing apparatus.

7. The method according to claim 1, wherein the display control is control for displaying, on a display of the information processing apparatus, a same screen as the screen displayed on the display of the image processing apparatus.

8. The method according to claim 1, wherein the predetermined connection is a Virtual Network Computing (VNC) connection, and the display control is control using VNC.

9. The method according to claim 1, wherein the first condition is a condition that the application is no longer operating as the user's operation target on the information processing apparatus, the status of the predetermined connection is in the first state, and the predetermined time has elapsed without the application operating as the user's operation target on the information processing apparatus again since the stop of the operation of the application as the user's operation target on the information processing apparatus.

10. The method according to claim 1, wherein the instruction to stop the display control is not transmitted to the image processing apparatus if a third condition that the application has stopped operating as the user's operation target on the information processing apparatus, the status of the predetermined connection is in the first state, and the application has started operating as the user's operation target on the information processing apparatus again before elapse of the predetermined time since the stop of the operation of the application as the user's operation target on the information processing apparatus.

11. The method according to claim 1, wherein
the first state is a state in which control is performed such that it is possible to establish a connection between the image processing apparatus for the display control and a different apparatus while the predetermined connection is valid, and
the second state is a state in which control is performed such that it is not possible to establish a connection between the image processing apparatus for the display control and a different apparatus while the predetermined connection is valid.

12. The method according to claim 1, wherein in a case where the status of the predetermined connection is in the first state, the information processing apparatus operates in a prioritized state in which the information processing apparatus automatically executes the predetermined connection again if a connection between the image processing apparatus for the display control and a different apparatus is established while the predetermined connection is valid, or a non-prioritized state in which the information processing apparatus does not automatically execute the predetermined connection again if a connection between the image processing apparatus for the display control and a different apparatus is established while the predetermined connection is valid.

13. The method according to claim 1, wherein if the first condition is satisfied, the prioritized state is canceled and the information processing apparatus is caused to operate in the non-prioritized state.

14. A system comprising:
an information processing apparatus; and
an image processing apparatus,
wherein the system includes one or more processors configured to:
perform display control so that a screen corresponding to a screen displayed on a display of the image processing apparatus is displayed on a display of the information processing apparatus; and
stop the display control if a first condition that an application operating on the information processing apparatus and configured to display the screen subjected to the display control is no longer operating as a user's operation target on the information processing apparatus, a status of a predetermined connection between the image processing apparatus for the display control and the information processing apparatus is in a first state, and a predetermined time has elapsed since stop of operation of the application as the user's operation target on the information processing apparatus is satisfied, and stop the display control before elapse of the predetermined time since the stop of the operation of the application as the user's operation target on the information processing apparatus if a second condition that the application is no longer operating as the user's operation target on the information processing apparatus and the status of the predetermined connection is in a second state is satisfied.

15. The system according to claim 14, wherein if the first condition is satisfied, an instruction to stop the display control is transmitted from the information processing apparatus to the image processing apparatus.

16. The system according to claim 14, wherein if the first condition is satisfied, information indicating that the first condition is satisfied is transmitted from the information processing apparatus to the image processing apparatus, and the display control is stopped based on the transmitted information.

17. An information processing apparatus configured to communicate with an image processing apparatus, the information processing apparatus comprising:
one or more processors; and
at least one memory storing executable instructions, which when executed by the one or more processors, cause the information processing apparatus to:
display a screen that corresponds to a screen displayed on a display of the image processing apparatus and that is subjected to display control by the image processing apparatus;
transmit an instruction to stop the display control to the image processing apparatus if a first condition that an application configured to display the screen subjected to the display control is no longer operating as a user's operation target on the information processing apparatus, a status of a predetermined connection between the image processing apparatus for the display control and the information processing apparatus is in a first state, and a predetermined time has elapsed since stop of operation of the application as the user's operation target on the information processing apparatus is satisfied; and
transmit the instruction to stop the display control before elapse of the predetermined time since the stop of the operation of the application as the user's operation target on the information processing apparatus if a second condition that the application is no longer operating as the user's operation target on the information processing apparatus and the status of the predetermined connection is in a second state is satisfied.

18. A non-transitory computer-readable storage medium storing one or more programs including instructions, which when executed by one or more processors of an information processing apparatus configured to communicate with an image processing apparatus, cause the information processing apparatus to perform a method comprising:
displaying a screen of an application, wherein the screen corresponds to a screen displayed on a display of the image processing apparatus and is subjected to display control by the image processing apparatus;
transmitting an instruction to stop the display control to the image processing apparatus if a first condition that the application is no longer operating as a user's operation target on the information processing apparatus, a status of a predetermined connection between the image processing apparatus for the display control and the information processing apparatus is in a first state, and a predetermined time has elapsed since stop of operation of the application as the user's operation target on the information processing apparatus is satisfied; and
transmitting the instruction to stop the display control before elapse of the predetermined time since the stop of the operation of the application as the user's operation target on the information processing apparatus if a second condition that the application is no longer operating as the user's operation target on the information processing apparatus and the status of the predetermined connection is in a second state is satisfied.

\* \* \* \* \*